US009074700B2

(12) United States Patent
Fuehrer

(10) Patent No.: US 9,074,700 B2
(45) Date of Patent: Jul. 7, 2015

(54) ACTUATING DRIVE FOR SAFETY VALVES HAVING A HIGH ACTUATING TORQUE

(75) Inventor: Michael Fuehrer, Biederitz (DE)

(73) Assignees: Fuehrer Engineering KG, Burg (DE); PRAEMAB Praezisionsmaschinen- und Anlagenbau GmbH, Burg (DE)

( * ) Notice: Subject to any disclaimer, the term of this patent is extended or adjusted under 35 U.S.C. 154(b) by 510 days.

(21) Appl. No.: 13/577,477

(22) PCT Filed: Feb. 11, 2011

(86) PCT No.: PCT/DE2011/000129
§ 371 (c)(1),
(2), (4) Date: Aug. 7, 2012

(87) PCT Pub. No.: WO2011/098075
PCT Pub. Date: Aug. 18, 2011

(65) Prior Publication Data
US 2012/0298894 A1 Nov. 29, 2012

(30) Foreign Application Priority Data
Feb. 15, 2010 (DE) .......................... 10 2010 008 092

(51) Int. Cl.
F16K 31/53 (2006.01)
F16K 31/02 (2006.01)
F16K 31/04 (2006.01)

(52) U.S. Cl.
CPC ............ *F16K 31/047* (2013.01); *F16K 31/048* (2013.01); *F16K 31/53* (2013.01)

(58) Field of Classification Search
USPC ................ 251/68, 69, 70, 71, 74, 248, 250.5, 251/129.11–129.13
See application file for complete search history.

(56) References Cited

U.S. PATENT DOCUMENTS 3,279,744 A * 10/1966 Fieldsen et al. .......... 251/129.03
3,921,264 A    11/1975 Madonian et al.
5,988,319 A * 11/1999 Hudson et al. ............. 185/40 R
6,015,142 A     1/2000 Ulicny
6,254,058 B1 *  7/2001 Keller ............................. 251/69
8,360,393 B2 *  1/2013 Park ........................ 251/129.03

OTHER PUBLICATIONS

International Search Report of PCT/DE2011/000129, Sep. 20, 2011.

* cited by examiner

*Primary Examiner* — John K Fristoe, Jr.
*Assistant Examiner* — Jonathan Waddy
(74) *Attorney, Agent, or Firm* — Collard & Roe, P.C.

(57) ABSTRACT

An actuating drive for safety valves has a high actuating torque. The actuating drive can be driven by a motor by means of a gear train. When the safety valve is opened, the motor simultaneously preloads a mechanical energy store that is connected to the input shaft of the safety valve and that can be locked. After the lock has been released, the mechanical energy store outputs the stored energy and closes the safety valve in the process. The output of the motor is connected to a planetary gear train, the output rotor of which is connected to the input shaft of the safety valve. The mechanical energy store consists of a number of leg springs that corresponds to the number of planet gears. The leg springs are connected at one end to one of the planet gears and at the opposite end to the housing of the actuating drive in a rotationally fixed manner.

5 Claims, 5 Drawing Sheets

ACTUATING DRIVE FOR SAFETY VALVES HAVING A HIGH ACTUATING TORQUE

CROSS REFERENCE TO RELATED APPLICATIONS

Figure 1:
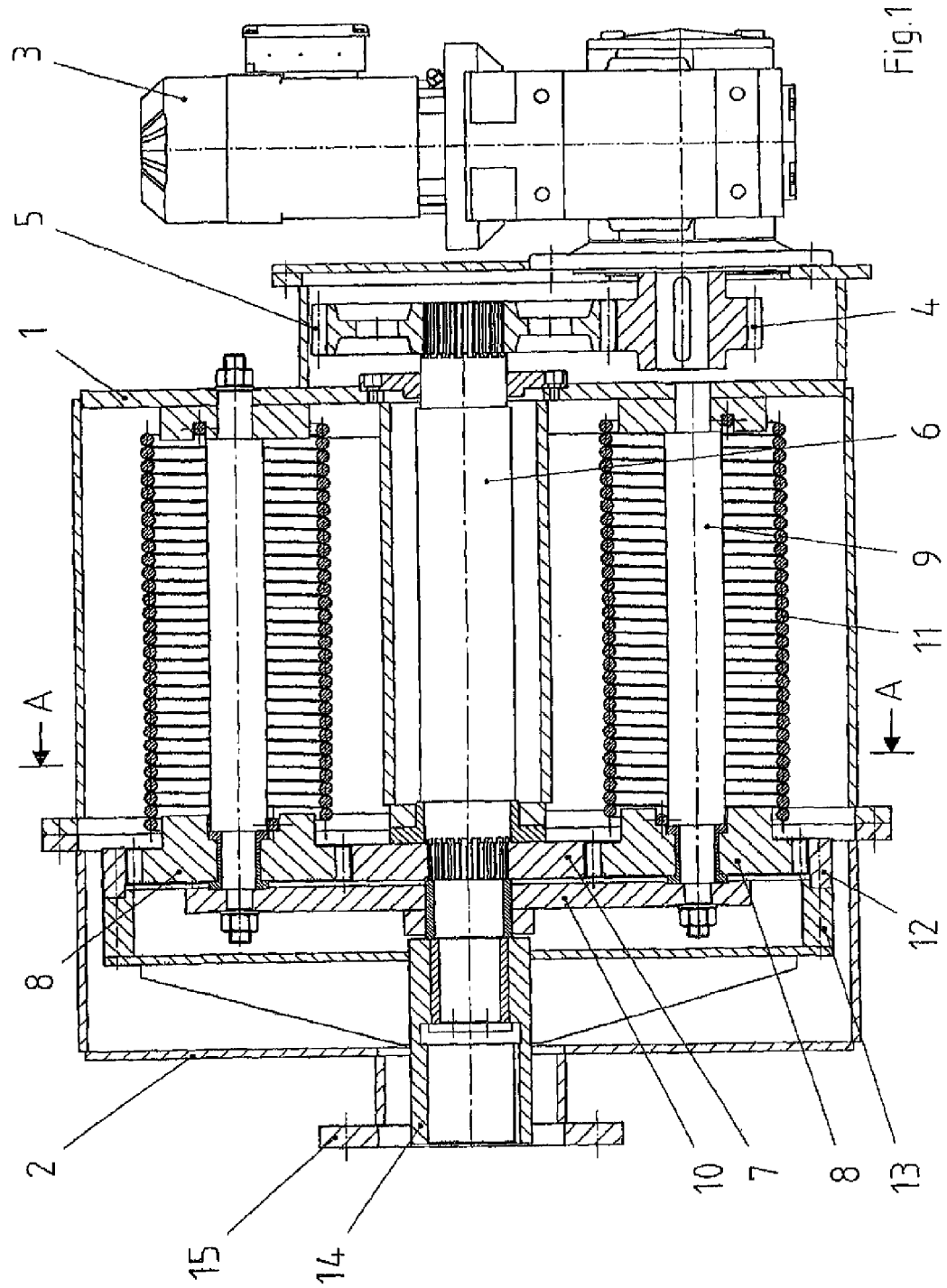

This application is the National Stage of PCT/DE2011/000129 filed on Feb. 11, 2011, which claims priority under 35 U.S.C. §119 of German Application No. 10 2010 008 092.6 filed on Feb. 15, 2010, the disclosure of which is incorporated by reference. The international application under PCT article 21(2) was not published in English.

STATE OF THE ART

The invention proceeds from an actuating drive for safety valves having a high actuating torque, in accordance with the preamble of the main claim.

Safety valves, so-called valves having a SAV function, are used, for example, for automatic closing of lines that carry combustible or other hazardous media. In the case of disruptions or in cases of breakdowns during which the actuating drives fail due to an interruption of the power supply, these valves close the line automatically. This is achieved in that a mechanical energy storage device, generally a spring, is preloaded at the same time during opening of the valve, in accordance with operations, the spring force of which device acts on the valve element. In the operating state, the valve element is held in the open position, counter to the force of the spring, by means of the actuating element. Because of the high torques required for activation of the valves, hydraulic and pneumatic actuating drives are used, but these are subject to a number of disadvantages. First of all, the great production and maintenance effort must be mentioned here; this effort is required not only by hydraulic units but also by pneumatic stations, including the storage systems. Energy storage devices having a dual-action pneumatic effect require an air chamber minimum pressure monitoring system, for example. For another thing, there is the risk of freezing of the media, particularly of the air, which must be dried, to a great extent, for this reason. Furthermore, pneumatics is one of the most expensive forms of energy. Last but not least, environmental technology concerns play a significant role. In the facilities and line systems, leaks must be absolutely avoided, not only to guarantee functional reliability, but also to prevent contamination of the soil with oil. In the case of pneumatic systems, exit of oiled compressed air is unavoidable in the event of triggering.

For these reasons, electrical actuating drives with mechanical energy storage devices have already been developed for safety valves, in which reliable drive of the actuating element, all the way to closing of the valve, is a given even in the event of failure of the supply voltage. In normal operation, an actuating drive driven by an electric motor drives the actuating element by way of a spur gear mechanism, and, in this connection, simultaneously charges the mechanical energy storage device. Layered plate springs, which are held in the tensed position by a holding brake that acts inversely, serve as mechanical energy storage devices. This holding brake serves as a trigger, in the event of a breakdown, whereby then, the energy storage device drives the actuating element by way of a three-speed worm gear drive and a ball drive spindle (see prospectus sheet of the SCHIEBEL company, Vienna).

The disadvantage of this actuating drive consists in that it is suitable only for valves having relatively small nominal widths, in which the drive torque does not exceed 2,000 Nm. Valves having rated widths of 300 mm, however, require drive torques of up to 5,500 Nm. Currently, no practicable technical solutions are known for this.

THE INVENTION AND ITS ADVANTAGES

The drive according to the invention for safety valves having the characterizing characteristics of the main claim, in contrast, has the advantage that it applies a sufficiently great drive torque so that even valves having rated widths above 200 mm can be safely closed in the event of a power failure. It is furthermore advantageous that significantly shorter closing times are achieved with the combination, according to the invention, of a planetary gear mechanism with the mechanical energy storage device, and this is of extreme importance for the safety of the overall system. This is achieved, according to the invention, in that the required closing torque is applied by a specific number of leg springs, which are disposed axis-parallel about the input shaft and are connected with the planetary gears of the planetary gear mechanism in torque-proof manner. As a result, the required closing torque is divided up among a plurality of individual mechanical energy storage devices, whereby this distribution is technically implemented by way of the planetary gears. It is also advantageous that energy storage takes place by means of twisting of the leg springs and not by means of a change in length of a pressure spring. As a result, the actuating drive can be structured with a significantly smaller construction overall than is the case for the conventional actuating drives, which are equipped only with a pressure spring, for example. The clearly greater degree of effectiveness as compared with the electrically driven mechanical energy storage devices also helps to contribute to an increase in the drive torque, with a simultaneously manageable construction size of the drive.

According to an advantageous embodiment of the invention, the output of the motor is connected with the planetary gear mechanism by way of at least one gear stage. As a result, the actuating torque and the rotation of the planetary gears can be adjusted very precisely to the conditions of the closing process to be performed on the safety valve.

According to an additional advantageous embodiment of the invention, the drive motor is a gear motor. As a result, the number of gear stages that are supposed to change the speed of rotation and/or the torque of the drive motor can be reduced, and thus the construction size of the actuating drive can be reduced.

According to yet another advantageous embodiment of the invention, the leg springs are disposed on the extended axles of the planetary gears. As a result, the connection between leg spring and planetary gear is possible on the shortest path, and a particularly compact construction of the actuating drive is possible.

According to an additional advantageous embodiment of the invention, a pin that projects axially from the planar surface is provided in the spur gear that drives the central shaft of the planetary gear mechanism, and a resilient stop is provided in the housing, against which the pin makes contact. As a result, the rotational movement of the central shaft and thus also of the output hollow shaft of the actuating drive is braked and limited.

Further advantages and advantageous embodiments of the invention can be derived from the following description, the drawing, and the claims.

DRAWING

Figure 2:
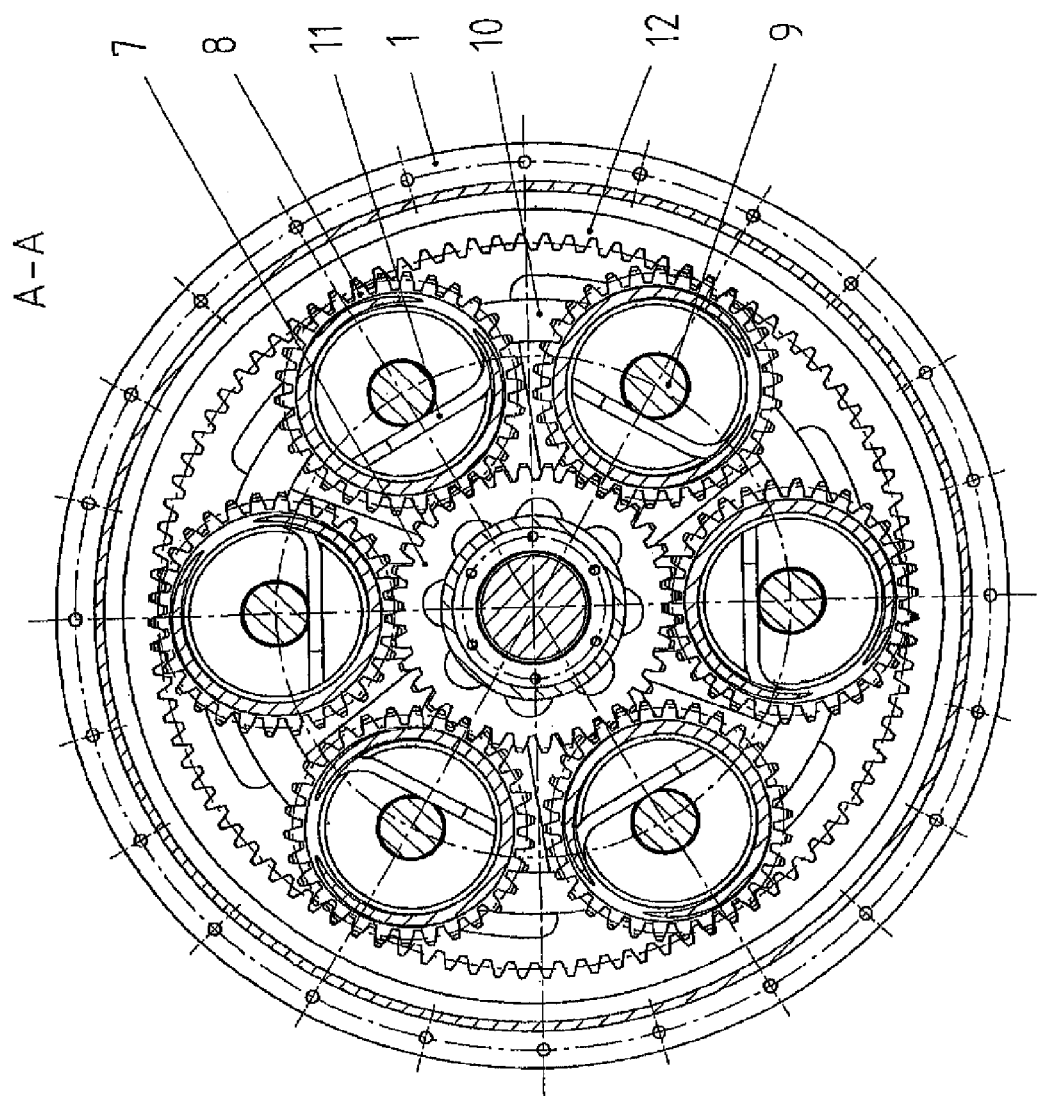
Figure 3:
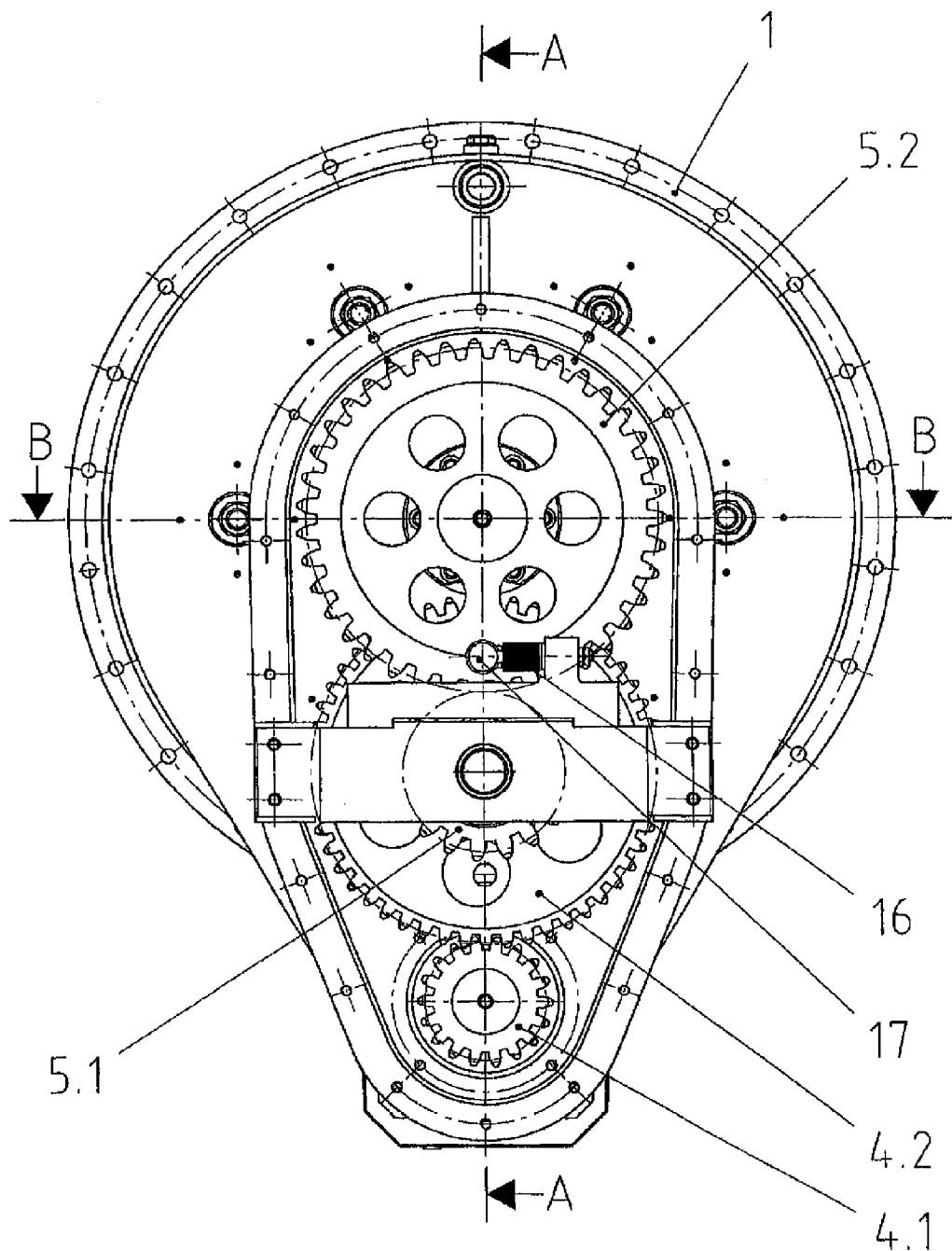
Figure 4:
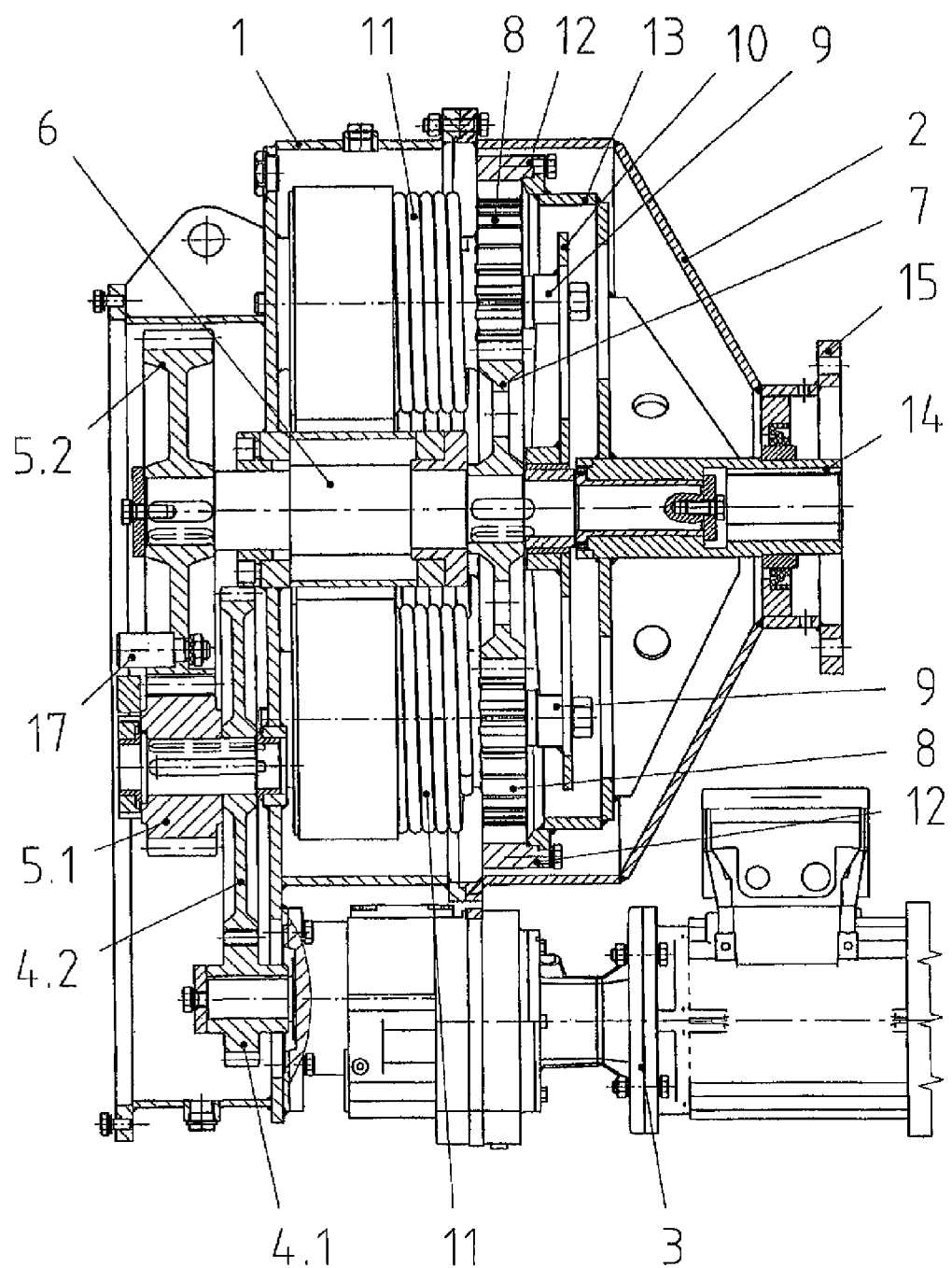
Figure 5:
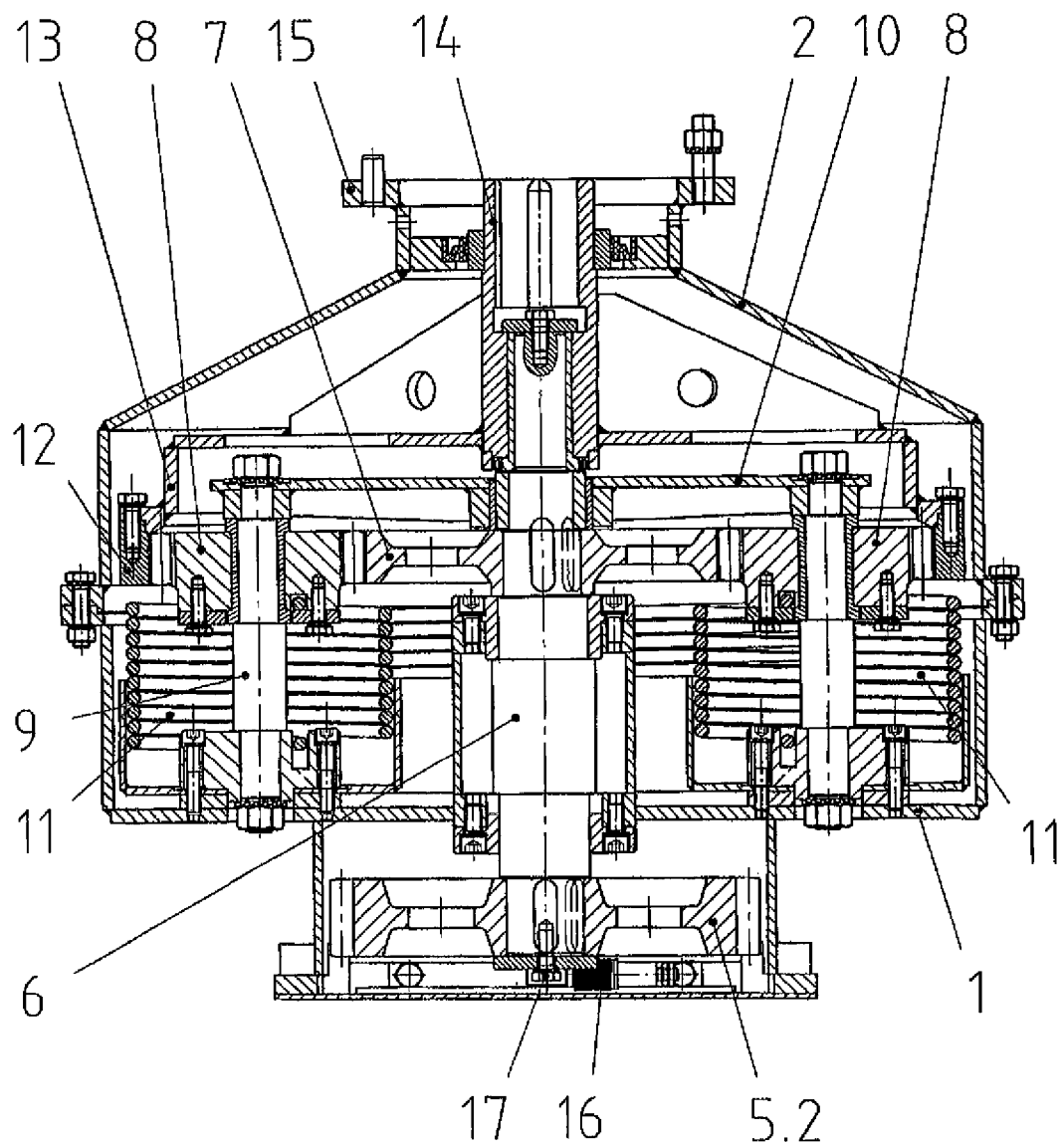

An exemplary embodiment of the invention is shown in the drawings and described in greater detail in the following. In the drawings, the figures show:

FIG. 1 an actuating drive according to the invention in section,

FIG. 2 a section A-A through the actuating drive from FIG. 1,

FIG. 3 the input-side view of the housing of a second embodiment of an actuating drive, FIG. 4 a section A-A through the actuating drive from FIG. 3, and FIG. 5 a section B-B through the actuating drive from FIG. 3.

DESCRIPTION OF THE EXEMPLARY EMBODIMENT

The actuating drive according to the invention is accommodated in a housing that consists of an input-side housing part 1 and an output-side housing part 2. It is driven by a gear motor 3, on the output journal of which a pinion 4 is disposed in torque-proof manner. The pinion 4 meshes with a spur gear 5 that is disposed on a central shaft 6 of the actuating drive. On the output side, the shaft 6 has a sun gear 7, on the circumference of which planetary gears 8 mesh, uniformly distributed, which in turn are mounted on spring axles 9 so as to rotate. The spring axles 9 support themselves, on the one side, in the input-side housing part 1, and, on the opposite side, in a planetary crosspiece 10, which, in turn, is secured on the shaft 6. Leg springs 11 are disposed on the spring axles 9; their one leg is firmly clamped in the input-side housing part 1, and their opposite leg is firmly clamped in the planetary gear 8, in each instance, close at the level of the outside diameter of the spring axle 9, in each instance, so that the leg springs 11 are connected, in torque-proof manner, with the planetary gear 8, in each instance, and with the input-side housing part 1. Furthermore, a hollow gear 12 meshes with the planetary gears 8; an output rotor 13 is flanged onto this gear with an output hollow shaft 14. The valve, not shown here, is screwed onto a flange 15 attached to the output-side housing part 2, whereby the input shaft of the valve is connected, in torque-proof manner, with the output hollow shaft 14 of the actuating drive.

FIG. 3 shows the input-side view of the housing of a second embodiment of an actuating drive, in which two gear stages (4.1, 4.2 and 5.1, 5.2) are inserted between gear motor 3 and planetary gear mechanism. Parts that perform the same function in this actuating drive as in the first embodiment shown in FIGS. 1 and 2 were provided with the same reference number. FIGS. 4 and 5 show sections of this embodiment.

In this embodiment, as well, the actuating drive is accommodated in a housing that consists of the input-side housing part 1 and the output-side housing part 2. The gear motor 3, which drives the actuating drive, is disposed below the housing parts 1, 2 in this embodiment, so that in total, a shorter construction is possible. A pinion 4.1 is disposed on the output journal of the gear motor 3, which pinion meshes with a spur gear 4.2, on the shaft of which a pinion 5.1 is disposed, in turn, which meshes with a spur gear 5.2 connected with the shaft 6 of the actuating drive, in torque-proof manner. The pinions 4.1 and 5.1 as well as the spur gears 4.2 and 5.2 form the reduction gear (FIG. 4). In this embodiment, the output side of the shaft 6, on which the sun gear 7 is seated, is located on the right side. As in the case of the first embodiment, as well, six planetary gears 8, uniformly distributed, mesh on the circumference of the sun gear 7; these are mounted on spring axles 9 so as to rotate. The spring axles 9 support themselves, on the one side, in the input-side housing part 1, and, on the opposite side, in the planetary crosspiece 10, which in turn is secured on the shaft 6. Leg springs 11 are disposed on the spring axles 9; their one leg is firmly clamped in the input-side housing part 1, and their opposite leg is firmly clamped in the planetary gear 8, in each instance, close at the level of the outside diameter of the spring axle 9, in each instance, so that the leg springs 11 are connected, in torque-proof manner, with the planetary gear 8, in each instance, and with the input-side housing part 1. The planetary gears 8 furthermore mesh in the hollow gear 12, onto which the output rotor 13 is flanged with the output hollow shaft 14. The valve, also not shown in FIGS. 3 to 5, is screwed onto the flange 15 attached to the output-side housing part 2, whereby the input shaft of the valve is connected, in torque-proof manner, with the output hollow shaft 14.

In FIGS. 3 and 5, a resilient stop 16 can be seen, which is attached in the input-side housing part 1 and, in the present example, is formed from plate springs. A pin 17 projects axially out of the planar surface of the spur gear 5.2 that faces the input-side housing part 1, which pin makes contact with the stop 16. This pin is positioned in the circumference region of the spur gear 5.2 in such a manner that it makes contact with the stop 16 just before completion of half a revolution of the spur gear 5.2, and therefore also of only half a revolution of the shaft 6. In this way, safe termination of the closing process of the actuating drive is guaranteed, i.e. over-rotation of the leg springs 11 in the direction opposite the tension direction is avoided.

In this variant of the restriction of the closing process of the valve, accordingly, all the gear mechanism parts 4.1, 4.2, 5.1, 5.2, 7, 8, 10, 12 situated in the active chain of the transfer of the actuating torque of the gear motor 3 must be dimensioned in such a manner that the valve is securely closed at half a revolution of the shaft 6.

In the following, the function of the actuating drive will be described:

When the actuating drive is assembled, the leg springs 11 are preloaded by the gear motor 3, so that the minimal required actuating moment exists from the beginning. Afterward, the actuating drive is connected with the closed safety valve. To open the safety valve, the gear motor 3 drives the output rotor 13 by way of the gear stage 4, 5 (FIG. 1) or the reduction gear stages 4.1, 4.2, 5.1, 5.2 (FIG. 4), the sun gear 7, the planetary gears 8, and the hollow gear 12. As a result, the leg springs 11 are tensed, at the same time, until the safety valve is completely open. In this connection, the gear stages or reduction gear stages 4, 5, 4.1, 4.2, 5.1, 5.2, the subsequent parts of the planetary gear mechanism 7, 8, 10, 12, as well as the leg springs 11 are dimensioned in such a manner that the leg springs 11 reach their maximal tensing torque in this state. When the safety valve is completely open, the holding brake of the motor is activated by means of an electrical signal, and the actuating drive and therefore also the safety valve are held in this position, which corresponds to the operating state at maximal through-flow, as long as this electrical signal is applied. Closing of the safety valve under normal operating conditions takes place by means of a switching process that releases the holding brake and puts the gear motor 3 into operation, whereby the leg springs 11 simultaneously relax to the minimal actuating torque. In contrast, the holding brake releases automatically in the event of a failure, an emergency shut-off, or other disruptions, but in any case in the event of a power failure, so that the leg springs 11 relax by themselves as a result of the lack of resistance of the holding brake, and, in this connection, put the output rotor 13 into movement by way of the planetary gears 8 and the hollow gear 12; this rotor immediately closes the safety valve by way of its output hollow shaft 14.

With continuing relaxation of the leg springs 11, mass inertia of the gear mechanism components 4, 5, 4.1, 4.2, 5.1, 5.2, 7, 8, 10, 12 situated in the active chain of the leg springs 11 ensures that they continue to run, similar to the principle of a flywheel, thereby ensuring complete closing of the safety valve.

All the characteristics presented in the specification, the following claims, and the drawing can be essential to the invention both individually and in any desired combination with one another.

REFERENCE NUMBER LIST

1 input-side housing part
2 output-side housing part
3 gear motor
4 pinion
4.1 pinion
4.2 spur gear
5 spur gear
5.1 pinion
5.2 spur gear
6 shaft
7 sun gear
8 planetary gear
9 spring axle
10 planetary crosspiece
11 leg spring
12 hollow gear
13 output rotor
14 output hollow shaft
15 flange
16 stop
17 pin

The invention claimed is:

1. An actuating drive for safety valves having a high actuating torque, which drive is driven by a motor by way of a gear mechanism, which motor simultaneously preloads a mechanical energy storage device that is connected with an input shaft of the safety valve and can be locked, which device gives off the stored energy again after the lock is released, and closes the safety valve in this process, wherein
   an output of the motor (3) is connected with a planetary gear mechanism (7, 8, 12, 13), an output rotor (13) of which is connected with the input shaft of the safety valve, and
   the mechanical energy storage device consists of a number of leg springs (11) that corresponds to the number of planetary gears (8), which springs in turn are connected with one of the planetary gears (8), in each instance, on the one side, and with a housing (1) of the actuating drive, in torque-proof manner, on the opposite side.

2. The actuating drive according to claim 1, wherein the output of the motor (3) is connected with the planetary gear mechanism (7, 8, 12, 13) by way of at least one gear stage (4, 5, 4.1, 4.2, 5.1, 5.2).

3. The actuating drive according to claim 1, wherein the motor is a gear motor (3).

4. The actuating drive according to claim 1, wherein the leg springs (11) are disposed on extended axles (9) of the planetary gears (8).

5. The actuating drive according to claim 1, wherein a stop (16) is disposed on a fixed part of the actuating drive and a pin (17) is disposed on a part of the gear mechanism (5.2) that performs no more than one revolution, which pin makes contact with the stop (16) to terminate the closing process.

\* \* \* \* \*